(12) United States Patent
Mersmann et al.

(10) Patent No.: US 9,987,897 B2
(45) Date of Patent: Jun. 5, 2018

(54) DEVICE FOR ADJUSTING THE HEIGHT OF A VEHICLE BODY

(71) Applicant: Schaeffler Technologies AG & Co. KG, Herzogenaurach (DE)

(72) Inventors: Simon Mersmann, Herzogenaurach (DE); Kilian Marsing, Hetzles (DE); Georgi Andreev, Herzogenaurach (DE); Marco Frank, Hemhofen (DE)

(73) Assignee: Schaeffler Technologies, AG & Co. KG, Herzogenaurach (DE)

( * ) Notice: Subject to any disclaimer, the term of this patent is extended or adjusted under 35 U.S.C. 154(b) by 0 days. days.

(21) Appl. No.: 15/324,899

(22) PCT Filed: Mar. 12, 2015

(86) PCT No.: PCT/DE2015/200148
§ 371 (c)(1),
(2) Date: Jan. 9, 2017

(87) PCT Pub. No.: WO2016/004932
PCT Pub. Date: Jan. 14, 2016

(65) Prior Publication Data
US 2017/0197484 A1 Jul. 13, 2017

(30) Foreign Application Priority Data
Jul. 9, 2014 (DE) .......................... 10 2014 213 341

(51) Int. Cl.
*B60G 15/00* (2006.01)
*B60G 17/005* (2006.01)
(Continued)

(52) U.S. Cl.
CPC ............ *B60G 17/005* (2013.01); *B60G 11/16* (2013.01); *B60G 13/001* (2013.01);
(Continued)

(58) Field of Classification Search
CPC .. B60G 17/021; B60G 17/0157; B60G 17/00; B60G 2202/42; B60G 2204/4604;
(Continued)

(56) References Cited

U.S. PATENT DOCUMENTS

| 3,618,927 | A | 11/1971 | Nicholls | |
|---|---|---|---|---|
| 7,926,822 | B2 * | 4/2011 | Ohletz | B60G 11/16 280/124.179 |

(Continued)

FOREIGN PATENT DOCUMENTS

| DE | 102010017352 | 12/2011 |
|---|---|---|
| EP | 1927486 | 6/2008 |

(Continued)

*Primary Examiner* — Toan To
(74) *Attorney, Agent, or Firm* — Volpe and Koenig, P.C.

(57) ABSTRACT

The invention relates to a device for adjusting the height of a vehicle body, having two components, which can be moved longitudinally relative to each other, and a movement thread, which is arranged between these components. The movement thread includes a partial thread which is designed as a spindle paired with a first component and a partial thread which is designed as a spindle nut paired with the other component. The partial threads are designed to be axially movable relative to each other by a rotational drive. The device also includes a locking device which bridges the movement thread in at least three longitudinal positions and which comprises an axially fixed locking ring that is arranged on the spindle in a rotatable manner and has locking cams distributed over the circumference and a shifting gate that is rigidly connected to the spindle nut in an axial manner, receives the locking cams, and includes locking stops, which are arranged at end positions of the at least three longitudinal positions and are distributed over the circumference, and switching ramps, which lie axially opposite the locking stops, are provided with slopes that decrease in the circumferential direction, and are arranged over the (Continued)

circumference. A movement of the locking cams towards the locking stops and towards the switching ramps in the shifting gate is provided by an axial movement of the spindle relative to the spindle nut, this displacement depending on a rotational direction of the rotational drive, and a selection of the locking stops is carried out by rotating the locking ring by the rotated locking cams resting against switching stops provided between the switching ramps. In order to shorten the switching paths and the switching times of the locking device, at least one switching ramp arranged between two locking stops is expanded relative to the remaining switching ramps in a direction of the locking stops.

10 Claims, 3 Drawing Sheets

(51) Int. Cl.
  B60G 15/06 (2006.01)
  B60G 11/16 (2006.01)
  B60G 13/00 (2006.01)
  B60G 17/02 (2006.01)
  B60G 17/015 (2006.01)
(52) U.S. Cl.
  CPC ........ *B60G 15/062* (2013.01); *B60G 17/0157* (2013.01); *B60G 17/021* (2013.01); *B60G 2202/312* (2013.01); *B60G 2202/42* (2013.01); *B60G 2204/1242* (2013.01); *B60G 2204/4191* (2013.01); *B60G 2204/42* (2013.01); *B60G 2500/30* (2013.01)

(58) Field of Classification Search
  CPC . B60G 2500/30; B60G 2204/44; F16H 25/20; F16H 25/2204; F16H 2025/2087
  USPC ............ 280/5.507, 5.514, 124.148, 124.154, 280/124.155
  See application file for complete search history.

(56) References Cited

U.S. PATENT DOCUMENTS

| 8,833,775 | B2* | 9/2014 | Kim ................... | B60G 15/063 280/124.145 |
| 9,694,643 | B2* | 7/2017 | Mersmann .......... | B60G 17/021 |
| 9,707,819 | B2* | 7/2017 | Dobre ................. | B60G 15/062 |
| 2004/0232648 | A1* | 11/2004 | Ohki ...................... | B60G 11/14 280/124.164 |
| 2007/0210539 | A1* | 9/2007 | Hakui ................. | B60G 15/063 280/5.514 |
| 2009/0045595 | A1* | 2/2009 | Michel ................ | B60G 17/021 280/6.157 |

FOREIGN PATENT DOCUMENTS

| EP | 1953013 | 8/2008 |
| EP | 2332756 | 6/2011 |
| JP | 2000130490 | 5/2000 |
| WO | 2015021952 | 2/2015 |
| WO | 2015021980 | 2/2015 |

\* cited by examiner

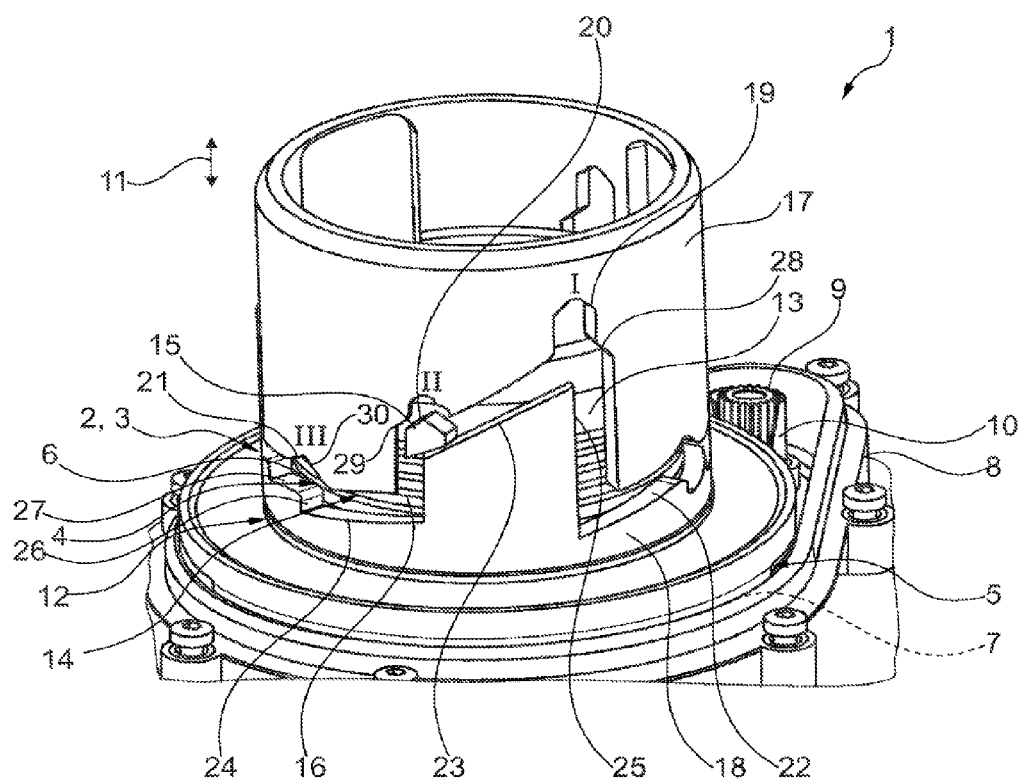
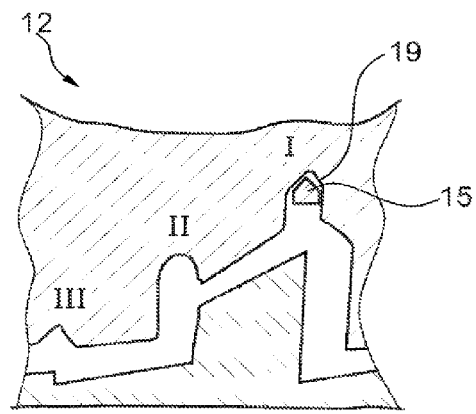
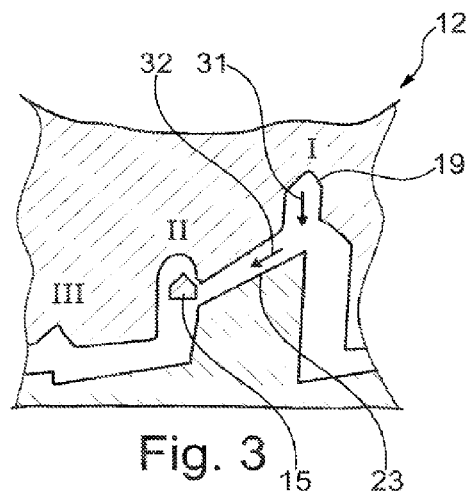
Fig. 1
Fig. 2
Fig. 3

DEVICE FOR ADJUSTING THE HEIGHT OF A VEHICLE BODY

BACKGROUND

The invention relates to a device for adjusting a vehicle body height. Devices according to the class for adjusting the height of vehicle bodies are provided, in particular, for increasing the ground clearance of motor vehicles or lowering the bodies in the event of flat roadways, for example, for decreasing the air resistance on the suspension struts, on a suspension strut mount, or on a hub carrier of the motor vehicle. Here, for example, corresponding to EP 2 332 756 A2, a height adjustment can be provided between two components, namely a holder of the suspension strut and an upper spring plate of a pre-tensioned spring of the suspension strut or, as is known from EP 1 953 013 A2, between a component holding a hub carrier, like a sleeve part, and a lower spring plate. An actuation of such devices is realized, for example, by means of an electric motor that rotationally drives a motion thread, for example, a spindle drive or ball spindle drive, so that an axial displacement of a fixed component relative to a component of the suspension strut displaceable axially towards this fixed component is realized from the rotational movement, for example, of a rotationally fixed and axially displaceable spindle and an axially fixed spindle nut driven rotationally from this and thus an essentially continuously variable height adjustment of the suspension strut and thus of the vehicle body is achieved with a corresponding setting of the ground clearance between an upper and a lower adjustment position. Here, shocks and jolts received by the wheel mounted on the suspension strut act negatively on the motion thread, in particular, on the balls and raceways of a ball screw drive.

SUMMARY

The objective of the invention is therefore to refine a device according to the class advantageously such that the motion thread can be bypassed in multiple steps.

The object is achieved by the subject matter of the invention. Advantageous embodiments of the invention are described below.

The proposed device is used for raising and lowering the vehicle body or for raising and lowering individual axles or the vehicle body, for example, of a chassis, a running gear with corresponding add-on parts and the like. For example, fuel savings can be achieved by reducing/optimizing the air resistance or the air flow around the vehicle when a speed-dependent level regulation is realized by lowering the vehicle body at high speeds and raising it at low speeds. Furthermore, load compensation or loading assistance can be realized by raising the vehicle body, for example, a vehicle rear end under high cargo load or lowering for easier and more convenient loading of the vehicle. Furthermore, an entry/exit aid can be achieved by raising or lowering the vehicle body. Off-road mobility can be realized by raising the vehicle for achieving a higher ground clearance. An improved roadway position can be achieved by lowering the vehicle body. In connection with a corresponding control system, for example, a roll or tilt control of the vehicle, tilting and rolling motions can be absorbed or applied. For example, the vehicle body can be steadied according to the sky-hook principle, in which the devices arranged on all wheels are controlled individually by a preferably central control device and thus each individual wheel can be changed (pro-)actively to certain roadway excitation.

For technical and economic reasons it has proven advantageous to provide a stroke between multiple longitudinal positions of 20 mm to 70 mm or more, preferably between 20 mm to 50 mm. An adjustment speed between the longitudinal positions is preferably between 5 mm/sec up to 100 mm/sec, advantageously between 5 mm/sec and 20 mm/sec. A preferred installation location of the device is on the suspension struts of one or all axles of a vehicle. The motion thread is preferably provided coaxial to a shock absorber of the suspension strut. The motion thread can here adjust the longitudinal positions and thus the stroke between a spring plate relative to a fixed component of the suspension strut. Alternatively, a stroke can be realized above the upper spring plate in the area of a suspension strut mount on the vehicle body, for example, between the shock absorber tube and the connection to the vehicle body. Alternatively, the motion thread can be provided under the lower spring plate between the spring plate and wheel carrier, for example, between the wheel connection and connection of the spring/shock absorber unit.

In a preferred embodiment, the motion thread has two threaded parts that are each allocated rotationally fixed to a component and are arranged so that they can rotate on each other. The threaded parts are in active engagement with each other, that is, they support the axial forces occurring in the different displacement positions of the components to be set. The formation of the active engagement can be formed directly between thread sections of the threaded parts or in the form of a ball screw drive by means of rolling elements, for example, balls or rollers, rolling between these parts. Here, the threaded parts can be displaced axially by rotating one relative to the other. For example, one threaded part can be rotationally fixed and axially displaceable on one of the components and the other threaded part can be axially fixed and rotatable on the other component. Furthermore, a threaded part can be fixed, that is, axially and rotationally fixed on one component, for example, a wheel carrier, wherein the other threaded part rotates and is simultaneously displaced axially. The rotatable threaded part can be driven in both rotational directions by a rotary drive, for example, an electric motor, in order to actuate the motion thread. Here, the threaded parts are formed preferably from a spindle and a spindle nut mounted so that it can rotate on this spindle. Either the spindle or the spindle nut are driven to rotate, wherein the threaded parts are displaced axially relative to each other. For example, for a rotationally driven spindle, the spindle nut or for rotationally driven spindle nut, the spindle can be rotationally fixed and axially displaceable, wherein the axial displacement, such as the spacing between the two components, is set between a lower and an upper adjustment position. In one especially preferred embodiment, for example, the spindle can be connected axially and rotationally fixed with a component, preferably a wheel carrier. The spindle nut is mounted so that it can rotate and is axially fixed in a housing, wherein the housing contains the spring plates for pre-tensioning a shock absorber spring, so that the spring plate is displaced relative to the suspension strut and therefore the spring plate can be axially displaced relative to the suspension strut and the level of the vehicle body can be raised and lowered.

For protecting the motion thread, in particular, of the axially loaded active engagement between the threaded parts, the active engagement is mechanically bypassed at multiple longitudinal positions between an upper and a lower adjustment position. Here, a switchable locking device can be provided that provides a switchable bypassing of the active engagement at the upper and/or lower adjustment position and/or at arbitrary positions in-between. In the expanded sense, bypassing of the motion thread is to be understood as the bypassing of its active engagement. For providing the locking device active between the upper and lower adjustment position of the components, preferably three or more switchable positive-fit connections are provided mechanically bypassing the active engagement of the motion thread. In the simplest case, a positive-fit connection is provided at an upper longitudinal position for a minimum spacing of the components and a positive-fit connection is provided at the lower longitudinal position for a maximum spacing of the components and a middle longitudinal position is provided between these.

The switching between these longitudinal positions takes place as a function of an axial displacement of the locking device switching the components according to the click-pen principle.

Here, the locking device contains, for example, a rotatable and axially fixed locking ring held on the spindle with locking cams arranged distributed over the periphery. In interaction with this, a shifting gate is arranged axially fixed on the spindle nut, wherein the locking cams are held and guided in this shifting gate. The shifting gate can be formed from a ramp ring with switching ramps distributed over the circumference and a guide sleeve with locking stops arranged distributed over the circumference. Here, the locking stops are arranged at end positions of the at least three longitudinal positions. The switching ramps that have slopes decreasing in the circumferential direction lie opposite the locking stops axially, wherein the switching ramps are each separated from each other by switching stops that lie axially opposite the locking stops essentially in the middle.

The control of the locking device is realized by a rotary drive that displaces the spindle and spindle nut axially relative to each other. Here, the locking cams move in a rotational direction against the switching ramps when the rotary drive is operating, wherein these rotate to a longitudinal position. If the rotational direction reverses, the locking cams move in the direction of the locking stops and are rotated while moving so that they are located for the next reverse movement at the slope of the next switching ramp and thus are rotated farther into the next longitudinal position. The locking cams mechanically bypass the motion thread at the locking stops.

According to the embodiment, here the spindle or the spindle nut can be rotationally driven by the rotary drive. Here, the spindle nut and spindle move axially relative to each other and thus lift or lower the level of the vehicle body as a function of the rotational direction of the rotary drive. Here, the shifting gate could also be mounted rotatable on the spindle nut. However, it has proven advantageous to hold the spindle nut rotatable and axially fixed on a housing with the rotary drive, wherein the shifting gate is held rotationally fixed on the housing. In this respect, the spindle can be connected fixed or integrated to the first component of the device and the housing to the other component of the device.

For shortening the switching times and switching paths of the locking device, at least one switching ramp arranged between two locking stops is extended in the direction of the locking stops relative to the other switching ramps. This means that one, several identical, or different switching ramps are offset axially relative to the other switching ramps axially in the direction of the locking stops. This axial extension preferably provided between the first and second longitudinal position enables a direct switching between the first and third longitudinal positions without the second longitudinal position having to be placed in-between. This saves both switching times and switching paths, in particular, a multiple rotational direction reversal of the rotary drive. By changing the axial extension of the switching ramps, the shifting gate can be provided with a guide groove for the locking cams essentially following the axial arrangement of the locking stops while eliminating axial elongated longitudinal grooves. This guide groove can be formed in a guide sleeve or as a guide slot. If the guide groove is merely stamped or pressed in, the ramp ring with the switching ramps and the guide sleeve with the locking stops can have an integral construction. Here, a closed guide sleeve tightly encapsulating the motion thread can be provided with the shifting gate and switching ramps.

According to a preferred embodiment, three locking stops distributed over the circumference can be allocated to each longitudinal position. Here, nine switching ramps distributed over the circumference can be provided, of these three axially extended switching ramps, three locking cams distributed uniformly over the circumference, and nine locking stops, wherein three locking stops arranged at a spacing of 120° about the spindle axis are arranged over the circumference for each longitudinal position and the locking stops of the individual longitudinal positions are each arranged offset by 40°.

According to one advantageous embodiment, for producing a proper switching function and switching performance, the switching stops are arranged in a circumferential area of the locking stops. This means that the switching stops are axially opposite the locking stops so that when the locking cams move from a switching stop in the direction of the locking stops, the locking cams are rotated while the locking ring rotates such that these are aligned to the next switching ramp. Here, control ramps that rotate the locking cams relative to the switching stops and orient them to the locking stops are preferably provided in the direction of motion toward the locking stops axially between switching stops and locking stops. Here, a relative rotation relative to the switching stops is realized so that, for a reverse movement of the locking ring after a rotational direction reversal of the rotary drive, the locking cams are rotated toward the slopes of the switching ramps in the circumferential direction in the direction of the switching stop of the next switching ramp.

Here, for shortening the switching times and the switching paths, it is preferably provided that the control ramps on the opposite wall of the shifting gate are provided on the at least one switching ramp extended in the direction of the locking stops. In this way, a switching from the first longitudinal position into the third can be realized in that, for the same rotational direction of the rotary drive, the locking cam is moved out of the third longitudinal position over the at least one extended switching ramp and at least one switching ramp adjacent in the circumferential direction against the switching stop opposite the third longitudinal position and after a subsequent rotational direction reversal of the rotary drive against the locking stop of the third longitudinal position. A switching from the first longitudinal position into the second can be realized in that for the same rotational direction of the rotary drive, the locking cams are moved from the third longitudinal position over the at least one extended switching ramp and the locking cams are moved to the locking stop of the second longitudinal position before reaching the next switching ramp and after successful rotational direction reversal of the rotary drive.

BRIEF DESCRIPTION OF THE DRAWINGS

The invention will be explained in more detail with reference to the embodiment shown in FIGS. 1 to 8. Shown here are:

FIG. 1 a device for adjusting the height of a vehicle body in 3-D partial view,

FIG. 2 a schematic part diagram of the device of FIG. 1 at the upper longitudinal position for minimum adjustment of the device, FIG. 3 a schematic part diagram of the device of FIG. 1 at a branch between a switching into the middle or the lower longitudinal position, FIG. 4 a schematic part diagram of the device of FIG. 1 at the middle longitudinal position for minimum adjustment of the device, FIG. 5 a schematic part diagram of the device of FIG. 1 with a continuous motion of the cam from the position of FIG. 3, FIG. 6 a schematic part diagram of the device of FIG. 1 with a continuous motion of the cam from the position of FIG. 5, FIG. 7 a schematic part diagram of the device of FIG. 1 at the lower longitudinal position for maximum adjustment of the device.

DETAILED DESCRIPTION OF THE PREFERRED EMBODIMENTS

Figure 8:
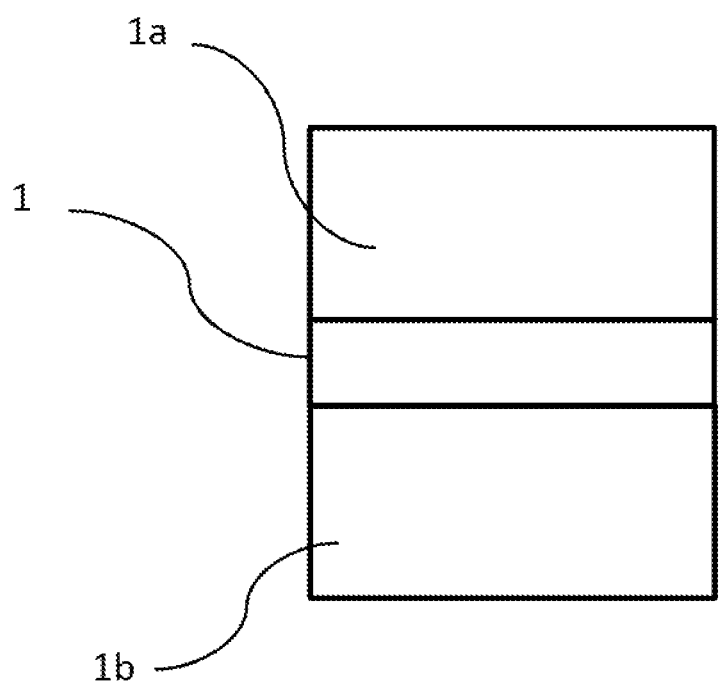
FIG. 8 illustrates a schematic view of the device of FIG. 1.

FIG. 1 shows the device 1 for adjusting the height of a vehicle body in a 3-D part diagram. The device 1 can be, for example, part of a suspension strut of an axle of a motor vehicle. Here, the motion thread 2 is arranged effectively between two components of the device 1 that can be moved relative to each other in the longitudinal direction. Here, the motion thread 2 —here constructed as a ball screw drive 3 —has the part thread 4, 5 in the form of the spindle 6 and the not-visible spindle nut 7 held so that it can rotate on the spindle 6. In the embodiment shown, the spindle nut 7 is held in the housing 8 so that it is axially fixed and rotatable by means of an axial bearing and moves axially relative to the stationary spindle 6 when driven to rotate. In the housing 8, the rotary drive 9 is also held, which rotationally drives the spindle nut 7 by means of the belt 10. FIG. 8 illustrates a schematic view of the device 1 arranged between the two components 1a, 1b.

In the spindle nut 7, the spindle 6 is held so that it can move axially and is rotationally fixed relative to the housing 8, so that the spindle 6 and spindle nut 7 are moved relative to each other and thus the components of the device 1 connected to these parts are moved axially by the rotary drive 9. Here, when the rotary drive 9 is operating in one rotational direction, the spacing of the components increases and when it operates in the other rotational direction, the spacing of the components of the device 1 decreases in the longitudinal direction along the double arrow 11.

For protecting the ball screw drive 3 against axial loads, the locking device 12 is provided, which, in the illustrated embodiment, mechanically bypasses the ball screw drive 3 at three different longitudinal positions I, II, III. Here, the locking device 12 has the locking ring 13 and shifting gate 14. The locking ring 13 is axially fixed and held rotatable on the spindle 6 and has the locking cams 15 distributed over the circumference. The locking cams 15 engage in the guide track 16 of the shifting gate 14. The shifting gate 14 is formed from the guide sleeve 17 and the ramp ring 18. The locking stops 19, 20, 21 alternating at different axial heights at the longitudinal positions I, II, III and distributed over the circumference are provided in the guide sleeve 17. These lie axially opposite the switching ramps 22, 23, 24 with the switching stops 25, 26, 27 active in the circumferential direction for the locking cams 15. For deflecting the locking ring 13 in the circumferential direction during a displacement of the spindle 6, the control ramps 28, 29, 30 are provided in front of the individual locking stops 19, 20, 21.

In the illustrated embodiment, the switching ramp 23 arranged between the switching ramps 22, 24 is extended axially in the direction of the locking stops 19, 20 opposite the switching ramps 22, 24. This enables a guide track 16 adapted to the width of the locking cams 15 over the entire profile of the locking cams 15. In addition, for corresponding control of the rotational direction of the rotary drive 9, a simplified switching between the locking stops 19 and 20, as well as a direct switching between the locking stops 19 and 21, is enabled.

FIGS. 2 to 7 show, in schematic diagrams, the cyclical switching of the individual locking states of the locking device 12 at the longitudinal positions I, II, III with reference to the reference symbols of FIG. 1.

In FIG. 2, the locking position of the locking device 12 at the longitudinal position I is shown. Here, the locking cams 15 contact the three locking stops 19 distributed over the circumference, of which only one is shown, and bypass the ball screw drive 3 for minimum spacing of the components of the device 1 relative to each other. Here, the flow of forces is realized from the first component via the housing 8, the shifting gate 14, the locking stops 19, the locking cams 15, and the locking ring 13 and its support in the spindle 6 directly into the second component, so that force is removed from the ball screw drive 3.

If the spindle nut 7 rotates—as shown in FIG. 3—in a first rotational direction, for example, as a function of the turning direction of the motion thread 2 as right-hand rotation, the locking cams 15 lift from the locking stops 19 and the locking cams 15 slide on the axially extended shifting ramp 23 in the direction of the arrows 31, 32 axially into the shown intermediate position below the locking stop 20. Depending on the rotational direction of the rotary drive 9 or the spindle nut 7, at this intermediate position, the displacement of the locking cams 15 into the switching position II or into the switching position III is realized. The detection of the position of the intermediate position is realized, for example, by means of a position sensor of the spindle 6 relative to the spindle nut 7, incrementally from the thread translation ratio of the motion thread 2 and the rotational angle information of the rotary drive or the like.

Figure 4:
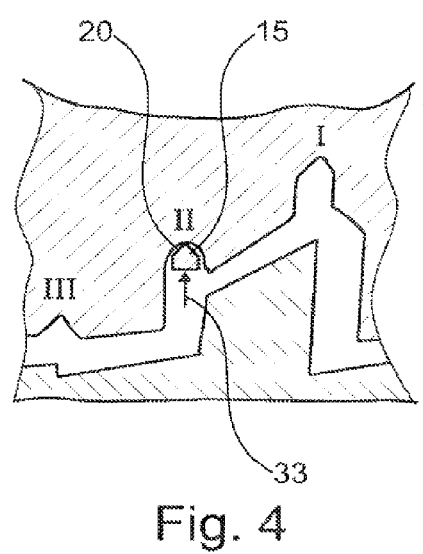
Figure 5:
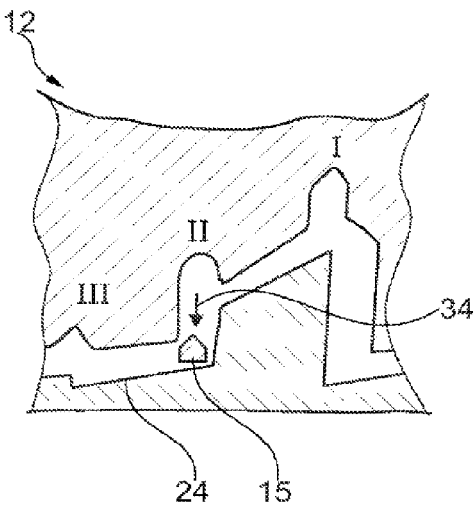
Figure 6:
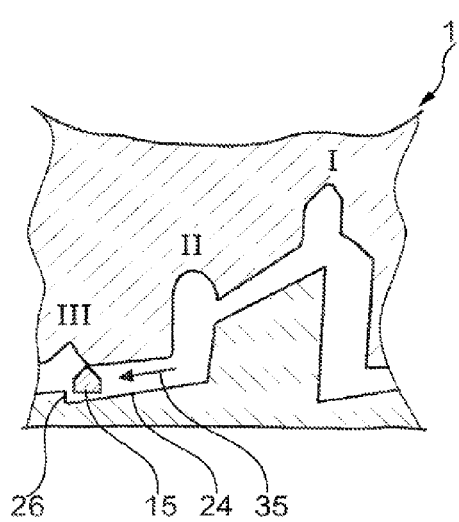
Figure 7:
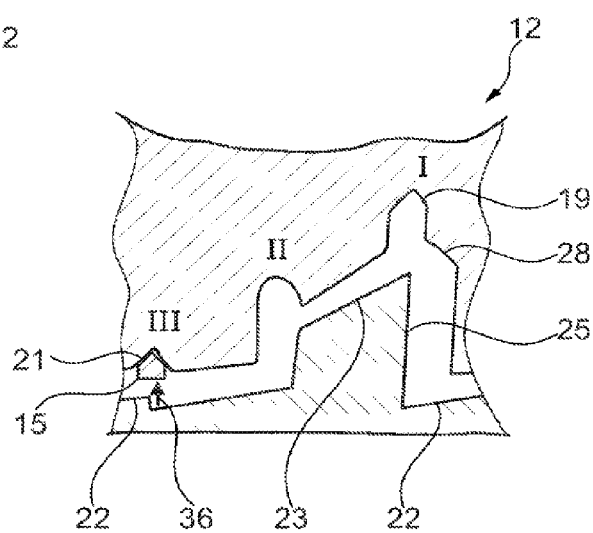

FIG. 4 shows the switching of the bypassing of the motion thread 2 at the longitudinal position II. Here, the rotational direction of the rotary drive 9 is reversed, for example, in left-hand rotation and the spindle 6 and thus the locking cams 15 are displaced in the direction of the arrow 33 to the locking stops 20. FIGS. 5 to 7 show the alternative switching of the bypassing of the motion thread 2 at the switching position III. Here, according to FIG. 5, the rotational direction, for example, right-hand rotation, is maintained so that the locking cams 15 are displaced in the direction of the arrow 34 on the switching ramps 24. Then the locking cams 15 slide—as shown in FIG. 6—along the switching ramps 24 in the direction of the arrow 35 on the switching stops 26. In this position, the rotational direction of the rotary drive 9 reverses and the locking cams 15 contact—as shown in FIG. 7—on the locking stops 21 of the longitudinal position III after displacement in the direction of the arrow 36.

Changing the switching position from the longitudinal position III into the longitudinal position I for completing the cyclical switching is realized by new reversal of the rotational direction of the rotary drive 9, for example, right-hand rotation. Here, the locking cams 15 move on the switching ramps 22 to the switching stops 25. A new reversal of the rotational direction moves these to the locking stops 19. Here, the locking cams 15 are rotated to the control ramps 28 so that these come in contact with the switching ramp 23 with the ongoing displacement.

LIST OF REFERENCE NUMBERS

1 Device
2 Motion thread
3 Ball screw
4 Partial thread
5 Partial thread
6 Spindle
7 Spindle nut
8 Housing
9 Rotary drive
10 Belt
11 Double arrow
12 Locking device
13 Locking ring
14 Shifting gate
15 Locking cam
16 Guide path
17 Guide sleeve
18 Ramp ring
19 Locking stop
20 Locking stop
21 Locking stop
22 Switching ramp
23 Switching ramp
24 Switching ramp
25 Switching stop
26 Switching stop
27 Switching stop
28 Control ramp
29 Control ramp
30 Control ramp
31 Arrow
32 Arrow
33 Arrow
34 Arrow
35 Arrow
36 Arrow
I Longitudinal position
II Longitudinal position
III Longitudinal position

The invention claimed is:

1. A device for adjusting a height of a vehicle body, comprising two components that are displaceable longitudinally relative to each other and a motion thread arranged between said two components with a partial thread formed as a spindle allocated to one of the components and a partial thread formed as the spindle nut allocated to the other of the components, the partial threads are formed so that they are displaceable axially relative to each other by a rotary drive, a locking device bypassing the motion thread in at least three longitudinal positions with a locking ring arranged on the spindle in an axially fixed and rotatable manner with locking cams distributed over a circumference and a shifting gate connected axially fixed to the spindle nut and holding the locking cams with locking stops arranged at end positions of the at least three longitudinal positions and distributed over the circumference, and switching ramps arranged axially opposite the locking stops and provided with slopes decreasing in a circumferential direction and arranged over the circumference, wherein a displacement of the locking cams in the shifting gate against the locking stops and against the switching ramps is provided by an axial displacement of the spindle relative to the spindle nut dependent on a rotational direction of the rotary drive, and a selection of the locking stops is realized by a rotation of the locking ring by the locking cams contacting switching stops in the circumferential direction between the switching ramps, and at least one of the switching ramps is extended axially relative to other ones of the switching ramps in a direction of the locking stops.

2. The device according to claim 1, wherein the three longitudinal positions are provided with a spacing of the components relative to each other, with a first one of the longitudinal positions being provided with a minimum spacing, a second one of the longitudinal positions being provided with a medium spacing, and a third one of the longitudinal positions being provided with a maximum spacing.

3. The device according to claim 2, wherein the at least one switching ramp extended in the direction of the locking stops is arranged between the first and second longitudinal positions.

4. The device according to claim 1, wherein the locking stops distributed over the circumference are allocated to each of the longitudinal positions.

5. The device according to claim 1, wherein the switching stops are arranged in a circumferential area of the locking stops.

6. The device according to claim 2, further comprising control ramps that, in a direction of motion toward the locking stops, rotate the locking cams relative to the switching stops, the control ramps being oriented toward the locking stops and being provided axially between the switching stops and locking stops.

7. The device according to claim 6, wherein the control ramps are provided on an opposite wall of the shifting gate on the at least one switching ramp extended in the direction of the locking stops.

8. The device according to claim 2, wherein a switching occurs from the first into the third longitudinal position in that, for the same rotational direction of the rotary drive, the locking cam is displaced out from the first longitudinal position via the at least one extended switching ramp and at least one of the switching ramps that is adjacent in the circumferential direction is displaced against the switching stop opposite the third longitudinal position and is displaced against the locking stop of the third longitudinal position after a subsequent reversal of the rotational direction of the rotary drive.

9. The device according to claim 2, wherein a switching occurs from the first longitudinal position into the second longitudinal position in that, for a first rotational direction of the rotary drive, the locking cam is displaced out from the first longitudinal position via the at least one extended switching ramp and the locking cam is displaced before reaching a next one of the switching ramps and against the locking stop of the second longitudinal position after successful reversal of the rotational direction of the rotary drive.

10. The device according to claim 1, wherein the motion thread is formed as a ball screw drive.

* * * * *